US010145458B2

(12) United States Patent
Norwich et al.

(10) Patent No.: US 10,145,458 B2
(45) Date of Patent: Dec. 4, 2018

(54) TORQUE CONVERTER DRIVE ASSEMBLY INCLUDING BIAS SPRING AND AXIALLY MOVABLE TURBINE (71) Applicant: Schaeffler Technologies AG & Co. KG, Herzogenaurach (DE)

(72) Inventors: Victor Norwich, Columbus, OH (US); Brian Zaugg, Millersburg, OH (US); David Avins, Burbank, OH (US); Daniel Gerdeman, Wooster, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 361 days.

(21) Appl. No.: 15/004,110

(22) Filed: Jan. 22, 2016

(65) Prior Publication Data
US 2017/0211673 A1    Jul. 27, 2017

(51) Int. Cl.
*F16H 45/02* (2006.01)
*F16D 13/28* (2006.01)
*F16D 3/12* (2006.01)
*F16D 23/12* (2006.01)

(52) U.S. Cl.
CPC ............ *F16H 45/02* (2013.01); *F16D 13/28* (2013.01); *F16D 3/12* (2013.01); *F16D 2023/123* (2013.01); *F16H 2045/0236* (2013.01); *F16H 2045/0278* (2013.01)

(58) Field of Classification Search
CPC ............. F16H 45/02; F16H 2045/0236; F16H 2045/0278; F16D 3/12; F16D 3/28
See application file for complete search history.

(56) References Cited

U.S. PATENT DOCUMENTS

| 4,441,595 A | 4/1984 | Lamarche |
| 4,867,290 A | 9/1989 | MacDonald et al. |
| 9,816,596 B1* | 11/2017 | Nelson .................... F16H 45/02 |
| 2010/0116614 A1 | 5/2010 | Sturgin |
| 2014/0097055 A1 | 4/2014 | Lindemann et al. |
| 2015/0027110 A1 | 1/2015 | Lindemann et al. |
| 2015/0037158 A1 | 2/2015 | Steinberger et al. |
| 2016/0146324 A1* | 5/2016 | Lindemann ............. F16H 45/02 192/3.28 |
| 2017/0314662 A1* | 11/2017 | Nelson .................... F16H 45/02 |

OTHER PUBLICATIONS

Search Report and Written Opinion of corresponding PCT application.

* cited by examiner

*Primary Examiner* — Ramya P Burgess
*Assistant Examiner* — David R Morris (57) ABSTRACT A drive assembly for a torque converter includes an axially movable turbine defining a piston of a lockup clutch; and a damper assembly including a first component including a plurality of first ramps and a second component including a plurality of second ramps, the first ramps configured for interacting with the second ramps to generate an axial force on the turbine during a coast condition of the torque converter, the damper assembly being arranged and configured to limit the axial force to prevent the piston from self-locking during the coast condition.

20 Claims, 8 Drawing Sheets

TORQUE CONVERTER DRIVE ASSEMBLY INCLUDING BIAS SPRING AND AXIALLY MOVABLE TURBINE

The present disclosure relates generally to torque converters and more specifically to torque converters including axially movable turbines.

BACKGROUND

Torque converters including axially movable turbines, where the piston and the turbine are combined into one component to form a lockup clutch are known, as shown for example in U.S. Publication No. 2015/0027110 A1.

SUMMARY OF THE INVENTION

A drive assembly for a torque converter is provided. The drive assembly includes an axially movable turbine defining a piston of a lockup clutch; and a damper assembly including a first component including a plurality of first ramps and a second component including a plurality of second ramps, the first ramps configured for interacting with the second ramps to generate an axial force on the turbine during a coast condition of the torque converter, the damper assembly being arranged and configured to limit the axial force to prevent the piston from self-locking during the coast condition.

A torque converter is also provided. The torque converter includes the drive assembly and an impeller. The piston engages the impeller.

A method of forming a drive assembly for a torque converter is also provided. The method includes connecting an axially movable turbine defining a piston of a lockup clutch to a damper assembly and aligning first ramps of the damper assembly with second ramps of the damper assembly. The first ramps are configured for interacting with the second ramps to generate an axial force on the turbine during a coast condition of the torque converter. The method also includes configuring and arranging the damper assembly to limit the axial force to prevent the piston from self-locking during the coast condition.

BRIEF DESCRIPTION OF THE DRAWINGS

The present invention is described below by reference to the following drawings, in which.

DETAILED DESCRIPTION

The disclosure provides an embodiment including a bias spring located between a damper assembly drive flange and an axially movable piston-turbine for turbine-piston control, especially during shift events and coast lockups. A cover plate includes inner diameter slots to interact with spring tabs of the bias spring to center the bias spring, transmit torque, and limit axial travel of the bias spring, which improves durability of the bias spring. The bias spring also includes ramp tabs to interact with coined ramps on a drive flange. In coast, an axial force is produced as the damper assembly travels. The spring tabs and ramp tabs are disposed alternately and circumferentially about an outer diameter of the bias spring. Another embodiment is also provided in which ramps are provided on plates of a damper assembly and axial compliance of the plates allows the plates to deflect away from each other to limit an axial force exerted on the turbine by the ramps. Also, the plates touch near their inner diameters to prevent deflection of turbine away from impeller from exceeding a predetermined desired amount.

Figure 1:
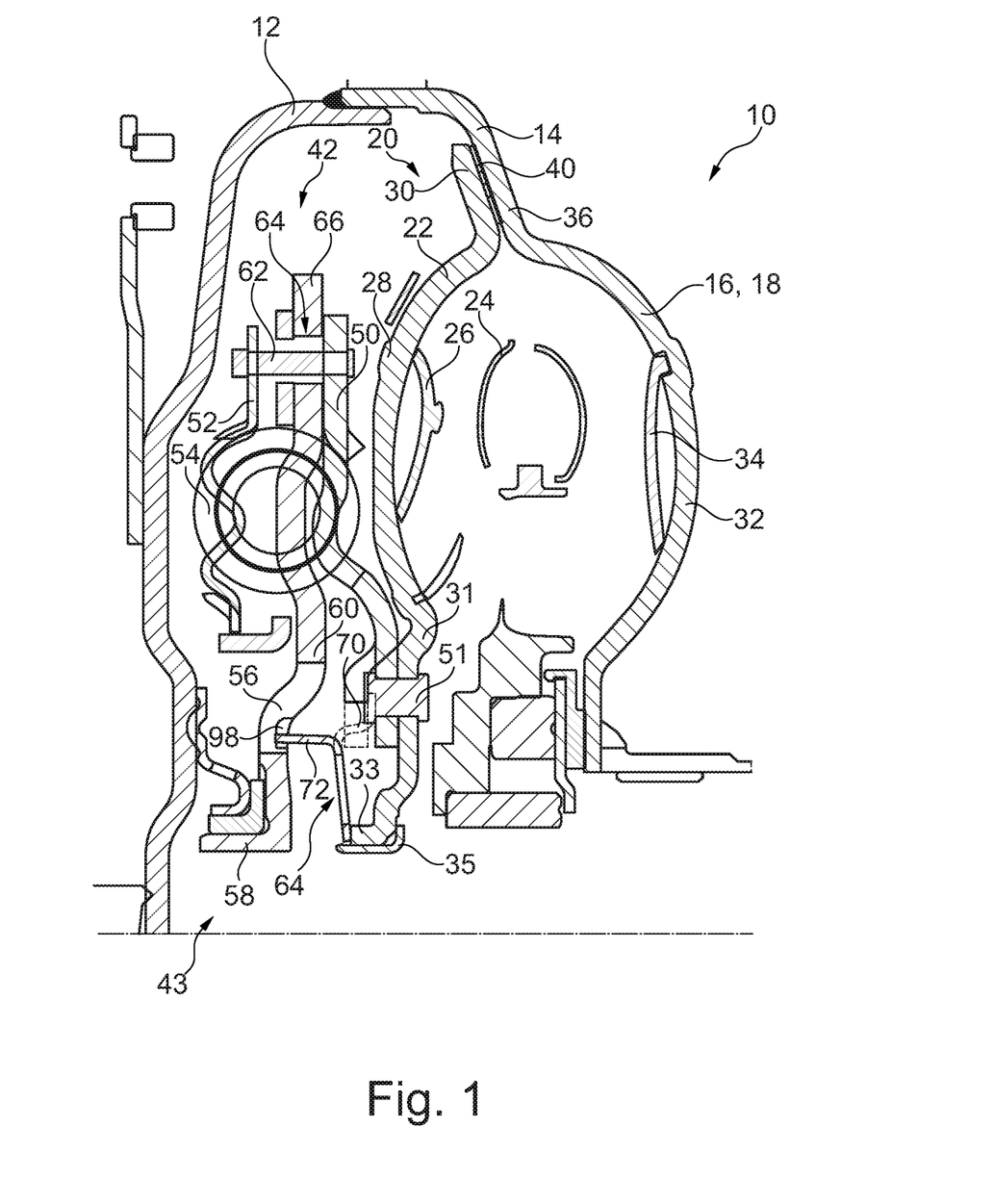
FIG. 1 schematically shows a cross-sectional side view of a torque converter in accordance with an embodiment of the present invention.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20 configured to define a piston that is axially moveable toward and away from impeller 18 to engage and disengage an impeller clutch of impeller 18 so as to form a lockup clutch. Turbine 20 includes a turbine shell 22 and an inner ring 24 supporting a plurality of turbine blades 26 therebetween. Turbine shell 22 includes a rounded blade supporting portion 28 for supporting of turbine blades 26 at a front cover side of the blades 26. Radially outside of blade supporting portion 28, an outer radial extension 30, which forms the piston, radially protrudes outwardly from an outer circumference of blade supporting portion 28. Accordingly, the piston and turbine shell 22 are formed as a single piece. Radially inside of blade supporting portion 28, turbine shell 22 includes an inner radial extension 31 that, at an inner radial end thereof, joins an axially extending inner circumferential section 33, whose inner circumferential surface contacts an outer circumferential surface of a hub 35. Impeller shell 16 includes a rounded blade supporting portion 32 for supporting a plurality of impeller blades 34. Radially outside of blade supporting portion 32, a radially extending wall 36, which forms an impeller clutch, radially protrudes outwardly from an outer circumference of rounded blade supporting portion 32. Accordingly, the impeller clutch and impeller shell 16 are formed as a single piece.

A friction material 40 is bonded onto a surface of outer radial extension 30 for engaging radially extending wall 36. In other embodiments, instead of or in addition to being bonded to outer radial extension 30, friction material 40 may be bonded to radially extending wall 36. A damper assembly 42, which together with turbine 20 form a drive assembly 43 of torque converter 10, is positioned between front cover 12 and turbine 20 and is configured for transferring torque from turbine 20 to a transmission input shaft. Damper assembly 42 includes two cover plates—a turbine side cover plate 50, which is riveted to turbine 20 by rivets 51, and a front cover side cover plate 52. Cover plates 50, 52 support a set of arc springs 54 axially therebetween. Damper assembly 42 also includes a drive flange 56 positioned axially between cover plate 50, 52. Drive flange 56 includes an inner radial hub 58 configured for nonrotatably connecting to a transmission input shaft. Drive flange 56 further includes circumferentially extending slots 60 for receiving springs 54. Radially outside of springs 54, cover plates 50, 52 are fixed together by a plurality of circumferentially spaced rivets 62. Rivets 62 pass through cover plates 50, 52 into circumferential spaces 64 formed between outer tabs 66 extending from a radial outer end of drive flange 56.

Outer radial extension 30 of turbine 20 engages impeller 18 at radially extending wall 36 via friction material 40 to transfer torque input into front cover 20 by the engine crankshaft to the transmission input shaft. As turbine 20 is driven by impeller 18, either through contact via friction material 40 and impeller shell 16 when the lockup clutch is locked or through fluid flow between blades 26, 34, turbine 20 transfers torque to damper assembly 42 via rivets 51. Cover plates 50, 52 transfer torque from turbine 20 to drive flange via springs 54. Drive flange 56 in turn drives the transmission input shaft.

Figure 2:
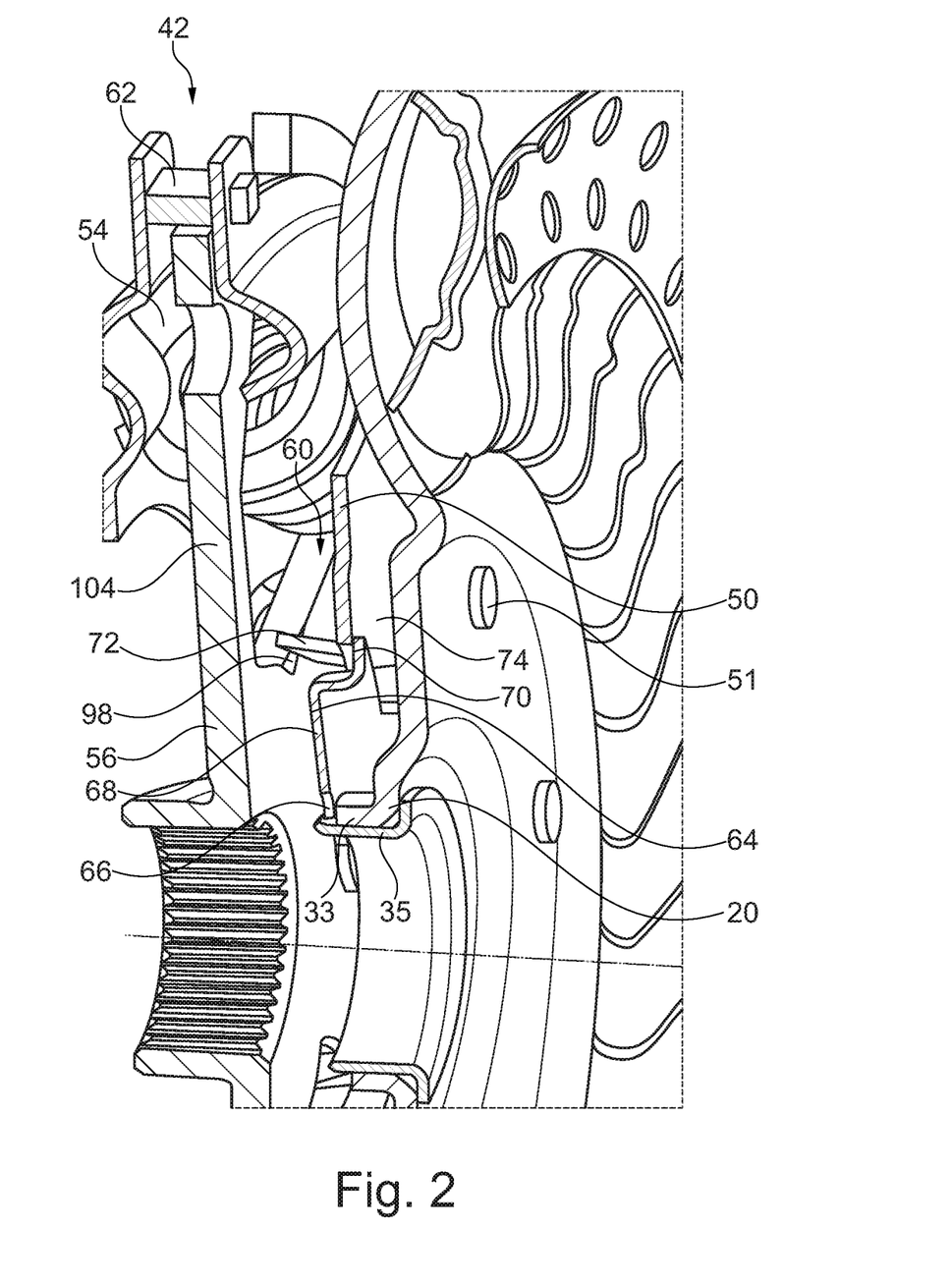
FIG. 2 shows a perspective view of cross-section of a drive assembly of the torque converter shown in FIG. 1.
Figure 3A:
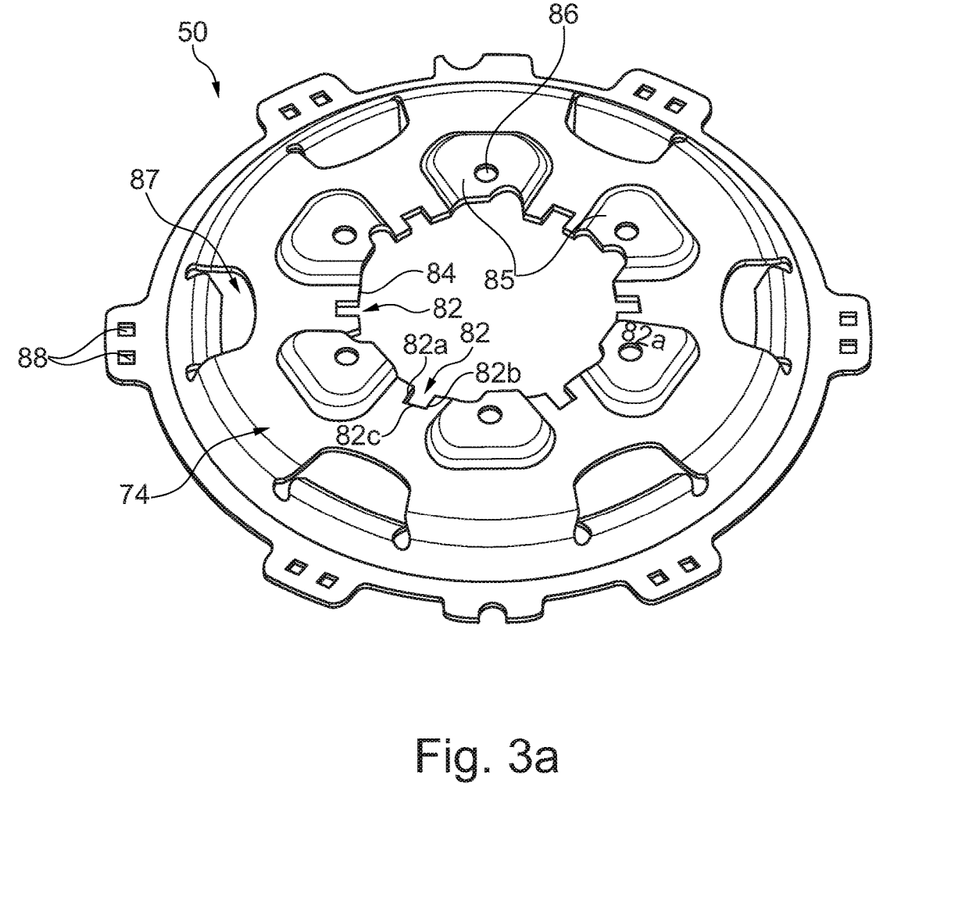
FIG. 3a shows a perspective view of a cover plate of the drive assembly shown in FIG. 2.

Damper assembly 42 further includes a bias spring 64, which in this embodiment is a diaphragm spring, is axially between drive flange 56 and turbine 20. FIG. 2, which shows a perspective view of cross-section of a portion of drive assembly 43, illustrates bias spring 64 engaging cover plate 50 and drive flange 56. FIG. 3a shows a perspective view of cover plate 50, FIG. 3b shows a perspective view of bias spring 64 and FIG. 3c shows a partial perspective view of drive flange 56.

Figure 3B:
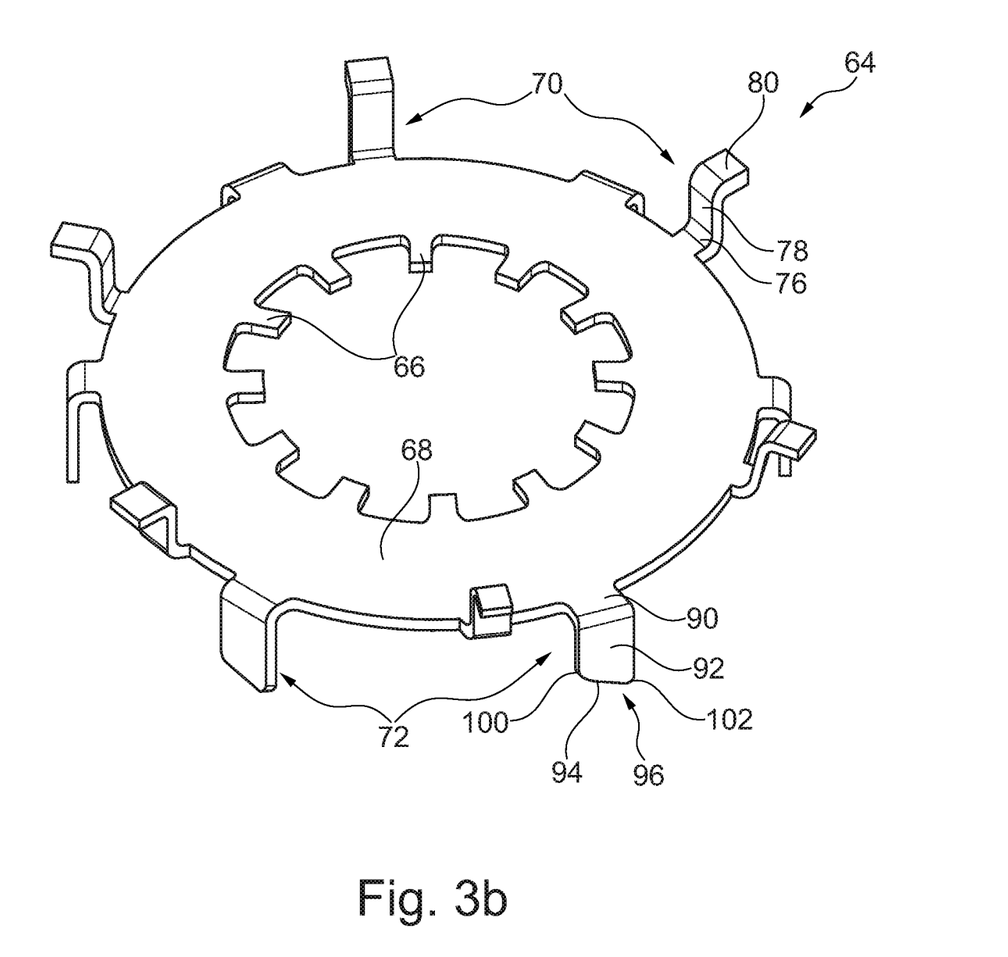
FIG. 3b shows a perspective view of a bias spring of the drive assembly shown in FIG. 2.
Figure 3C:
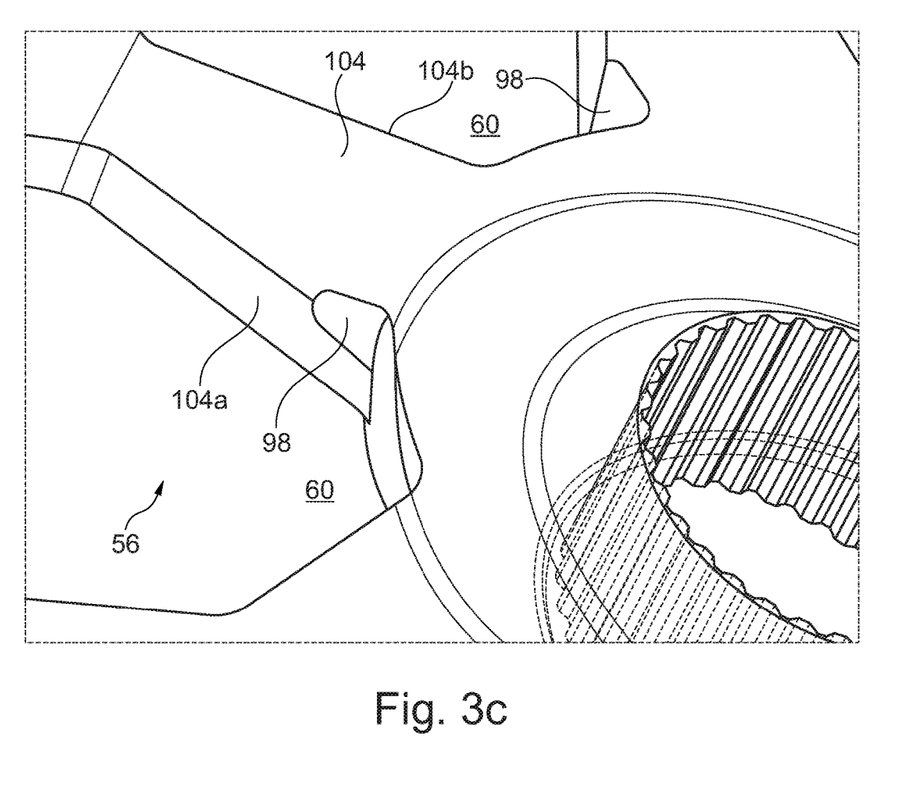
FIG. 3c shows a partial perspective view of a drive flange of the drive assembly shown in FIG. 2.

Referring to FIGS. 2 and 3b together, bias spring 64 includes a plurality of radially inwardly extending tabs 66 at an inner radial end thereof defining an inner circumference of bias spring 64 and for contacting the outer circumferential surface of hub 35. Tabs 66 also axially abut turbine 20 at axially extending inner circumferential section 33. Tabs 66 extend inwardly from a disc shaped base section 68, which at an outer circumference thereof is provided with a plurality of cover plate engaging tabs 70 and a plurality of drive flange engaging tabs 72, which are circumferentially offset from each other in an alternating manner such that each tab 70 is positioned between two adjacent tabs 72 and each tab 72 is positioned between two adjacent tabs 70. Tabs 70 extend axially away from base section 68 toward turbine 20 and engage a turbine side radially extending surface 74 of cover plate 50. Tabs 70 include an inner radial extension 76 connected to the outer circumference of base section 68 and in the same plane as base section 68, an axial extension 78 connected at one end to inner radial extension 76 and extending axially from inner radial extension 76 toward turbine 20, and an outer radial extension 80 extending radially outward from the other end of axial extension 78. As shown in FIG. 3a, cover plate 50 includes a plurality of radially outwardly extending slots 82 extending away from an inner circumferential surface 84 of cover plate 50. Each slot 82 is defined by two radially extending walls 82a, 82b and a circumferentially extending wall 82c connecting walls 82a, 82b. Each tab 70 is received in one of slots 82. More specifically, axial extension 78 is received in slot 82 and contacts walls 82a, 82b and outer radial extension 80 contacts turbine side radially extending surface 74 of cover plate 50. The interaction between slots 82 and tabs 70 serve to center bias spring 64, transmit the torque required to wind-up bias spring 64 and limit the axial travel of bias spring 64.

Referring to FIGS. 2 and 3a, cover plate 50 is provided with embossments 84 protruding at the turbine side of cover plate 50, each including a hole 86 for receiving one of rivets 51. Embossments 84 allow turbine side radially extending surface 74 of cover plate 50 to contact turbine 20 in a manner that allows tabs 70 to extend into an area axially between cover plate 50 and turbine 20. Radially outside of embossments 84, cover plate 50 includes circumferentially extending slots 86 for receiving springs 54, and radially outside of slots 86 cover plate 50 is provided with holes 88 for receiving rivets 62.

Referring back to FIGS. 2 and 3b, tabs 72 extend axially away from tabs 70 and toward drive flange 56. Tabs 72 each include a radial extension 90 connected to the outer circumference of base section 68 and in the same plane as base section 68, and an axial extension 92 connected at one end to radial extension 90 and extending axially from radial extension 90 toward drive flange 56. Each axial extension 92 is provided with a ramp 94 at an axial free end 96 thereof for contacting a respective one of ramps 98 (FIGS. 2, 3c) of drive flange 56. Ramps 94, as they extend circumferentially, extend axially outward away from base section 68 between an axially inner edge 100 and an axially outer edge 102.

Referring to FIGS. 2 and 3c, drive flange 56 includes arms 104 extending radially outward from inner radial hub 58. Arms 104 define circumferentially extending slots 60 therebetween and each include two circumferential edges 104a, 104b—one for contacting a circumferential edge of one of springs 54 and the other for contacting a circumferential edge of another of the springs 54. Each arm 104 is provided with one ramp 98 extending at an angle from circumferential edge 104a to turbine side radially extending surface 106. Ramps 98 are radially inside of arc springs 54. In one preferred embodiment, ramps 98 are formed in arms 104 by coining. Each ramp 98 matches the angle of one of ramps 94 such that relative circumferential motion between drive flange 56 and bias spring 64 causes contact between the ramps 94, 98 to force bias spring 64 away from drive flange 56. When damper assembly 42 travels into the coast direction, ramps 98 contact ramps 94 to produce an axial force.

Bias spring 64 is preloaded, i.e., compressed between drive flange 56 and turbine 20, during installation and does not relax to a free state. When in drive, there is no axial force being transmitted by bias spring 64, and therefore damper assembly 42 has no additional hysteresis, which may be beneficial for NVH performance, and the performance during a shift event can be equal to that of a baseline torque converter. Additionally, damper assembly 42 is arranged and configured to limit the axial force generated by ramps 94, 98 to prevent the piston from self-locking during the coast condition. More specifically, the maximum load produced in the coast condition is limited by the load characteristics of bias spring 64 and the geometry of ramps 94, 98, which prevents the lockup clutch from self-locking at high coast torques during the coast condition.

Figure 4:
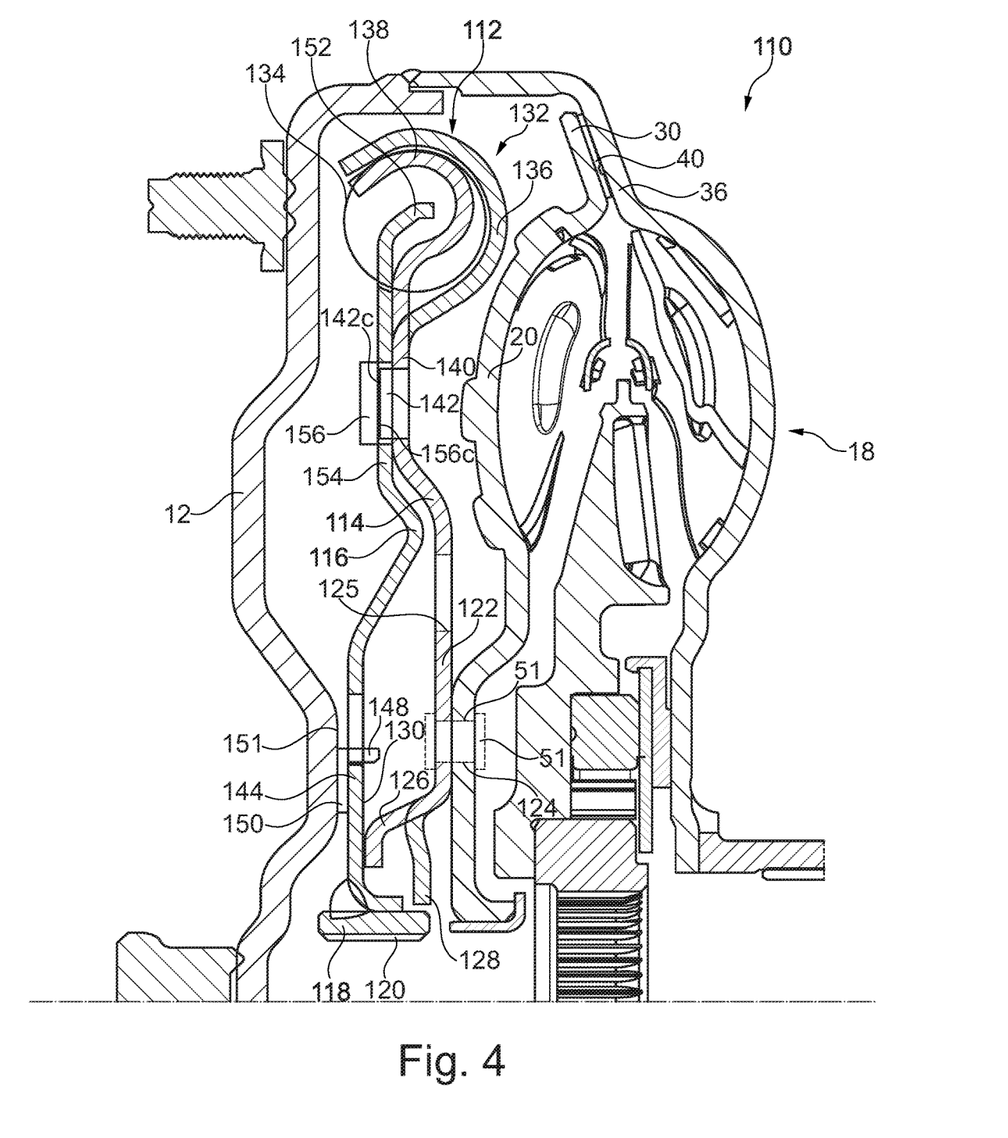
FIG. 4 shows a cross-sectional side view of a torque converter in accordance with another embodiment of the present invention.
Figure 5A:
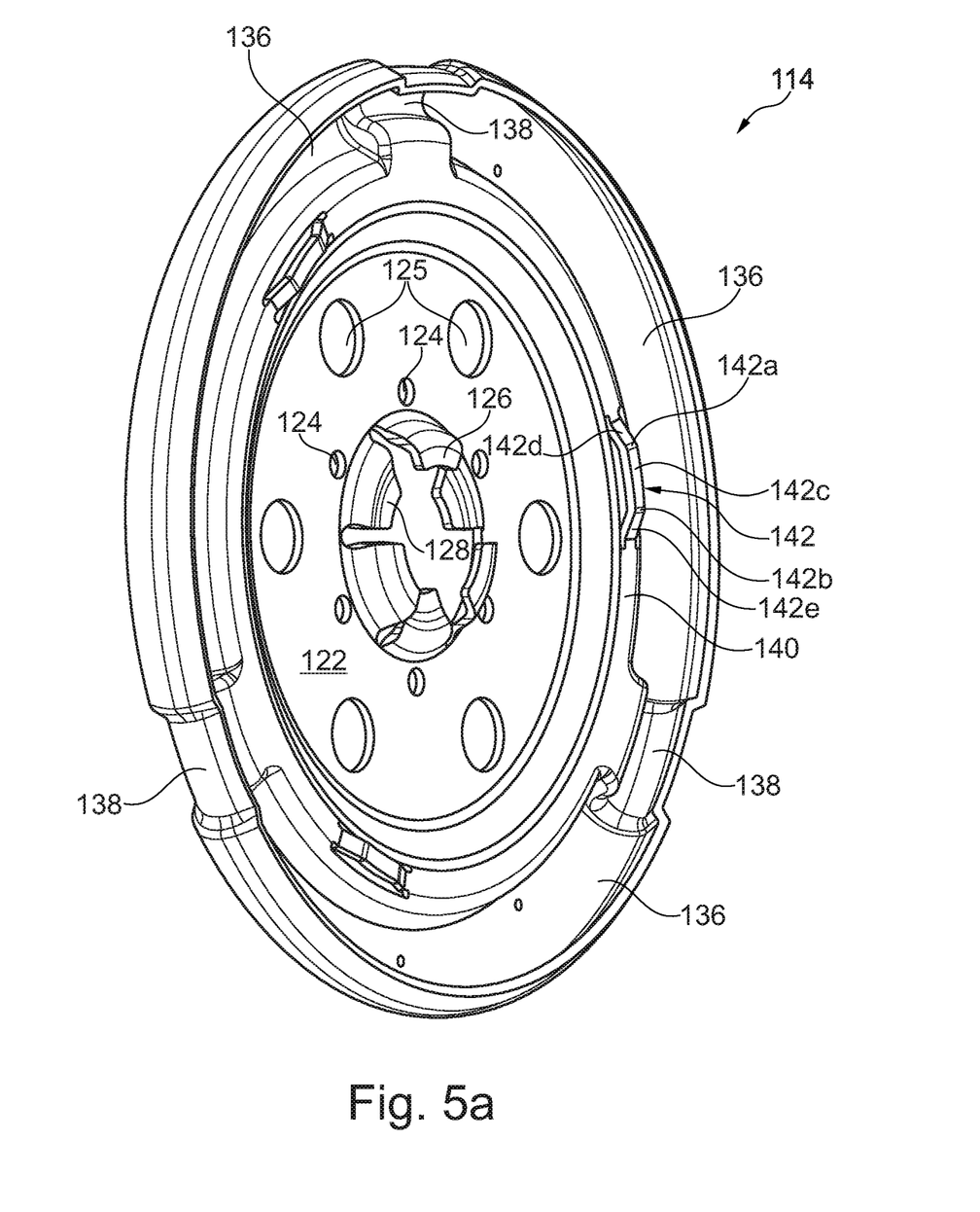
FIG. 5a shows a perspective view of a first plate of a damper assembly of the torque converter shown in FIG. 4.

FIG. 4 shows a cross-sectional side view of a torque converter 110 in accordance with another embodiment of the present invention. Torque converter 110 is configured in the same manner as torque converter 10, except that damper assembly 42 is replaced by a damper assembly 112. Accordingly, aside from the components of damper assembly 112, all other components of torque converter 110 correspond to those described above with respect to torque converter 10 and are identified by the same reference numerals. Damper assembly 112 includes two plates—a first or turbine side plate 114, which is riveted to turbine 20 by rivets 51, and a second or front cover side plate 116, which is connected to a hub 118 having an inner splined surface 120 configured for connecting to a transmission input shaft. FIG. 5a shows a perspective view of a first plate 114 and FIG. 5b shows a perspective view of second plate 116.

Referring to FIGS. 4 and 5a together, first plate 114 includes a flat annular base section 122 provided with smaller holes 124 axially extending therethrough for receiving rivets 51 and larger holes 125, which are radially outside of holes 124, axially extending therethrough for decreasing an axial stiffness of plate 114. Radially inside of base section 122, at a radially inner end thereof, first plate 114 splits into two sets of tabs 126, 128 that are axially and circumferentially offset from each other. At a radially outer end thereof, first plate 114 includes a spring retainer 132 configured for retaining arc springs 134. In this embodiment, damper assembly 112 includes three arc springs 134 and spring retainer 132 includes three circumferentially extending arc shaped pockets 136, each for receiving one arc spring 134, with each arc shaped pocket 136 having an inner surface contoured to an outer surface of the corresponding arc spring 134. Circumferentially between pockets 136, radially outer end of first plate 114 includes drive tabs 138. Each drive tab 138 is configured for contacting one circumferential edge of each arc springs 134 and is axially and radially offset with respect to pockets 136.

Radially between spring retainer 132 and base section 122, first plate 114 includes a ramp support section 140 supporting a plurality of first ramps 142. Ramps 142 are stamped from ramp support section 140 and axially protrude away from ramp support section 140 toward front cover 12 and away from turbine 20. Ramps 142 are axially tapered and thus each include a first contact surface end 142a that is axially closer to support section 140 and a second contact surface end 142b that is axially further away from support section 140 than end 142a, with a ramp contact surface 142c extending circumferentially between ends 142a, 142b and tapering axially away from support section 140 at surface 142b extends from first end 142a to second end 142b. In this embodiment, ramp contact surfaces 142c are formed on front cover side radially extending surfaces of ramps 142. Contact surface ends 142a, 142b are connected to support section 140 by respective legs 142d, 142e extending axially between the respective ends 142a, 142b and support section 140.

Figure 5B:
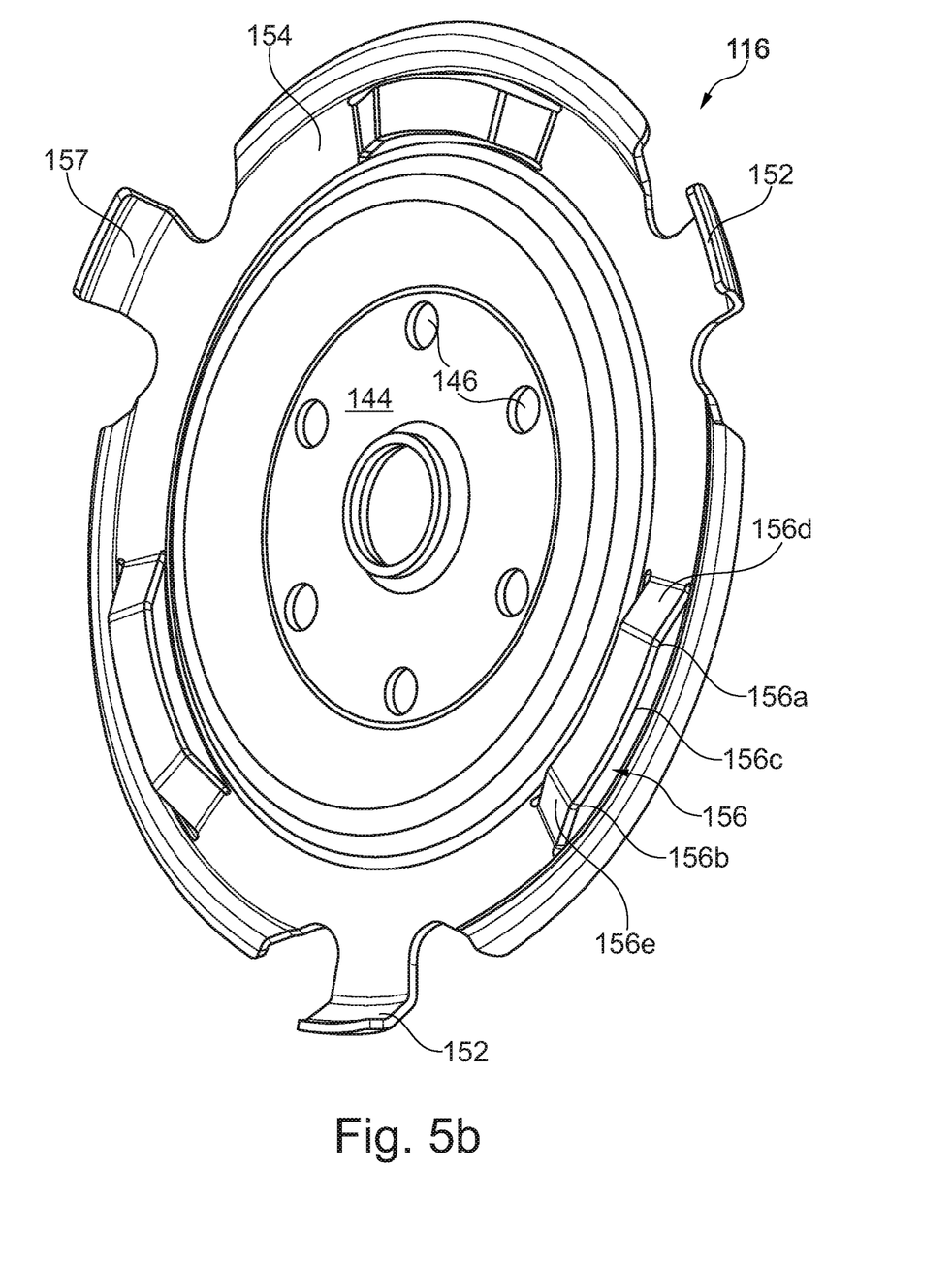
FIG. 5b shows a perspective view of a second plate of the damper assembly of the torque converter shown in FIG. 4

Referring to FIGS. 4 and 5b together, second plate 116 includes a flat annular base section 144 provided with holes 146 axially extending therethrough for decreasing an axial stiffness of plate 116 and for receiving posts 148 of an axial thrust washer 150, which limits the axial travel of damper assembly 112 and turbine 20 toward front cover 12 by contacting an inner radially extending surface 151 of front cover 12. At a radially outer end thereof, second plate 116 includes a plurality of circumferentially spaced driven tabs 152 configured for extending axially into spaces circumferentially between springs 134 such that each driven tab 152 contact one circumferential edge of each arc springs 134. Each arc spring 134 is thus held circumferentially between one drive tab 138 and one driven tab 152 During operation of torque converter 110, first plate 114 transfers torque from turbine 20 to second plate 116 via drive tabs 138 transferring torque to driven tabs 152 via springs 134. Second plate 116 in turn transfers torque to the transmission input shaft via inner splined surface 120 of hub 118.

Radially between tabs 152 and base section 144, second plate 116 includes a ramp support section 154 supporting a plurality of second ramps 156. Ramps 156 are stamped from ramp support section 154 and axially protrude away from ramp support section 154 toward front cover 12 and away from turbine 20. Ramps 156 are axially tapered and thus each include a first contact surface end 156a that is axially closer to support section 154 and a second contact surface end 156b that is axially further away from support section 154 than end 156a, with a ramp contact surface 156c extending circumferentially between ends 156a, 156b and tapering axially away from support section 154 at surface 156b extends from first end 156a to second end 156b. In this embodiment, ramp contact surfaces 156c are formed on turbine side radially extending surfaces of ramps 156. Contact surface ends 156a, 156b are connected to support section 154 by respective legs 156d, 156e extending axially between the respective ends 156a, 156b and support section 154.

Referring to FIGS. 4 to 5b together, each ramp 142, via contact surface 142c, is configured for contacting a respective one of ramps 156, via contact surface 156c. In this embodiment, ramps 142 are shorter in length than ramps 156 and each extend axially into a corresponding space formed in support section 154 of second plate 116 by the stamping of ramps 156. Because ramps 142 are shorter than ramps 156, ramps 142 are circumferentially slidable in the spaces in support section 154 to generate axial forces. In other embodiments, ramps 142, 156 may be formed in an opposite manner, with ramps 156 being shorter than ramps 142 and each extending axially into a corresponding space formed in support section 140 of first plate 114 by the stamping of ramps 142. Each contact surface 142c matches the angle of a corresponding one of contact surface 156c such that relative circumferential motion between plates 114, 116 causes contact between the ramps 142, 156 to produce an axial force on turbine 20, the piston—more specifically outer radial extension 30 of turbine 20 is axially forced toward radially extending wall 36 of impeller 18. When damper assembly 112 travels into the coast direction, ramps 142 contact ramps 156 to produce the axial force. Additionally, damper assembly 112 is arranged and configured to limit the axial force generated by ramps 142, 156 to prevent the piston from self-locking during the coast condition. More specifically, the maximum load produced in the coast condition is limited by the axial compliance of plates 114, 116, which prevents the lockup clutch from self-locking at high coast torques during the coast condition. Also, plates 114, 116 touch near their inner diameters, more specifically tab 126 contact flat annular base section 144 while thrust washer 150 contacts inner radially extending surface 151 of front cover 12, to prevent deflection of turbine 20 away from impeller 15 from exceeding a predetermined desired amount. In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter drive assembly comprising:
an axially movable turbine defining a piston of a lockup clutch; and
a damper assembly including a first component including a plurality of first ramps and a second component including a plurality of second ramps, the first ramps contacting the second ramps to generate an axial force on the turbine during a coast condition of the torque converter, the damper assembly being arranged and configured to limit the axial force to prevent the piston from self-locking during the coast condition.

2. The torque converter drive assembly as recited in claim 1 wherein the first component is a drive flange and the second component is a bias spring preloaded between the drive flange and the turbine, the bias spring configured to limit the axial force to prevent the piston from self-locking during the coast condition.

3. The torque converter drive assembly as recited in claim 2 wherein the bias spring includes a plurality of tabs extending axially toward the drive flange, the second ramps being on the tabs.

4. The torque converter drive assembly as recited in claim 2 wherein the drive flange includes an inner radial hub and a plurality of arms extending radially outward from the inner radial hub, each of the arms including one of the first ramps.

5. The torque converter drive assembly as recited in claim 4 wherein the arms define circumferentially extending slots therebetween for receiving arc springs, the first ramps being radially inside of the arc springs.

6. The torque converter drive assembly as recited in claim 1 wherein the damper assembly includes a cover plate, the second component including tabs extending axially toward the turbine into slots formed in the cover plate.

7. The torque converter drive assembly as recited in claim 1 wherein the first component includes a spring retainer at a radially outer end thereof retaining springs therein and the second component includes tabs configured to be driven by the first component via the springs, an axial compliance of the first and second components limiting the axial force to prevent the piston from self-locking during the coast condition.

8. The torque converter drive assembly as recited in claim 7 further comprising an axial thrust washer is fixed to the second component.

9. The torque converter drive assembly as recited in claim 1 wherein the turbine includes a turbine shell and the piston extends radially outward from the turbine shell, the piston and the turbine shell being formed a single piece.

10. A torque converter comprising:
the torque converter drive assembly as recited in claim 1; and
an impeller, the turbine configured for engaging the impeller to lock the lockup clutch.

11. The torque converter as recited in claim 10 wherein the impeller includes an impeller shell, the impeller shell and a portion of the impeller engaged by the turbine being formed as a single piece.

12. The torque converter drive assembly as recited in claim 1 wherein the first component includes a base section, the first ramps each extending circumferentially while extending axially away from the base section.

13. A method of forming a drive assembly for a torque converter comprising:
connecting an axially movable turbine defining a piston of a lockup clutch to a damper assembly and aligning first ramps of the damper assembly with second ramps of the damper assembly, the first ramps contacting the second ramps to generate an axial force on the turbine during a coast condition of the torque converter; and
configuring and arranging the damper assembly to limit the axial force to prevent the piston from self-locking during the coast condition.

14. The method as recited in claim 13 wherein the damper assembly includes a drive flange including the first ramps and a bias spring including the second ramps, the bias spring limiting the axial force to prevent the piston from self-locking during the coast condition.

15. The method as recited in claim 14 wherein the configuring and arranging the damper assembly to limit the axial force includes aligning the bias spring on a cover plate of the damper assembly.

16. The method as recited in claim 15 wherein the cover plate includes a plurality of radially extending slots formed therein and the bias spring includes a plurality of axially extending tabs, the aligning the bias spring on the cover plate including providing each of the axially extending tabs into one of the slots.

17. The method as recited in claim 16 wherein each of the tabs includes an outer radial extension, the aligning the bias spring on the cover plate including contacting a turbine side radially extending surface of the cover plate via the outer radial extension.

18. The method as recited in claim 13 wherein the damper assembly includes a first plate including spring retainer at a radially outer end thereof retaining springs therein and a second plate including tabs configured to be driven by the first plate via the springs, the first plate including the first ramps and the second plate including the second ramps, the configuring and arranging the damper assembly to limit the axial force including providing an axial thrust washer to contact an inner radially extending surface of a front cover of the torque converter to limit the axial force to prevent the piston from self-locking during the coast condition.

19. The method as recited in claim 18 wherein the providing the axial thrust washer includes fixing the axial thrust washer to the second plate.

20. The method as recited in claim 13 wherein a first component of the damper assembly includes a base section, the first ramps each extending circumferentially while extending axially away from the base section.

* * * * *